United States Patent [19]

Kolkmann et al.

[11] Patent Number: 4,889,702

[45] Date of Patent: Dec. 26, 1989

[54] PROCESS FOR REMOVING METALLIC CONSTITUENTS FROM DUST OBTAINED DURING THE ELECTROTHERMAL PRODUCTION OF YELLOW PHOSPHORUS

[75] Inventors: Friedrich Kolkmann, Brühl; Klaus Jödden, Erftstadt, both of Fed. Rep. of Germany

[73] Assignee: Hoechst Aktiengesellschaft, Frankfurt am Main, Fed. Rep. of Germany

[21] Appl. No.: 277,567

[22] Filed: Nov. 29, 1988

Related U.S. Application Data

[63] Continuation of Ser. No. 112,382, Oct. 22, 1987, abandoned.

[30] Foreign Application Priority Data

Nov. 5, 1986 [DE] Fed. Rep. of Germany ....... 3637670

[51] Int. Cl.$^4$ ...................... C01B 25/01; C01B 25/02; C01B 25/04
[52] U.S. Cl. ......................... 423/323; 75/25; 423/44; 423/96; 423/97; 423/107; 423/108; 423/135; 423/304; 423/322
[58] Field of Search .................. 423/200, 44, 96, 97, 423/107, 108, 135, 304, 323, 322; 75/25

[56] References Cited

U.S. PATENT DOCUMENTS

| | | | |
|---|---|---|---|
| 1,820,606 | 8/1931 | Easterwood | 403/323 |
| 4,396,424 | 8/1983 | Yatsumami et al. | 75/25 |
| 4,537,756 | 8/1985 | Rottgen et al. | 423/323 |
| 4,673,431 | 6/1987 | Briemont | 75/25 |
| 4,678,647 | 7/1987 | Lisowyj et al. | 423/96 |

FOREIGN PATENT DOCUMENTS

| | | | |
|---|---|---|---|
| 163595 | 2/1963 | U.S.S.R. | 423/322 |
| 1151504 | 4/1985 | U.S.S.R. | 423/323 |

*Primary Examiner*—John Doll
*Assistant Examiner*—Jeffrey E. Russel

[57] ABSTRACT

Metallic constituents, especially heavy metal constituents are removed from dust electrostatically separated from a gas mixture consisting substantially of carbon monoxide and phosphorus in vapor form obtained during the electrothermal production of yellow phosphorus. To this end, the dust is initially calcined with continuous agitation under oxidizing conditions at temperatures of 300° to 800° C.; next, the resulting calcined matter is mixed with carbon and the mixture is treated at temperatures of 950° to 1200° C. under reducing conditions with volatilization of the metallic constituents; and the volatized metallic constituents are ultimately condensed and separated.

4 Claims, No Drawings

PROCESS FOR REMOVING METALLIC CONSTITUENTS FROM DUST OBTAINED DURING THE ELECTROTHERMAL PRODUCTION OF YELLOW PHOSPHORUS

This application is a continuation of our copending application Ser. No. 07/112,382, filed Oct. 22, 1987, now abandoned.

This invention relates to a process for removing metallic constituents, especially heavy metal constituents from a gas mixture consisting substantially of carbon monoxide and phosphorus in vapor form obtained during the electrothermal production of yellow phosphorus.

Under the strongly reducing conditions prevailing in an electrothermal phosphorus furnace, a good deal of the metallic constituents introduced into the phosphorus furnace together with the feed materials crude phosphate, coke and gravel issue from the phosphorus furnace as gaseous elemental matter or readily volatile oxides together with the furnace gas consisting substantially of phosphorus in vapor form and carbon monoxide. The most important metallic constituents comprise zinc, cadmium, lead, silver, gallium, germanium and alkali metals; these condense either as discrete particles or on the surface of dust particles contained in the phosphorus furnace gas. The discrete particles as well as dust particles are separated electrostatically from the phosphorus furnace gas, normally with the use of a Cottrell electric precipitator, from which so-called Cottrell-dust is ultimately removed.

Cottrell-dust with its relatively high metal content, can either be removed, processed and deposited (cf. U.S. Specification No. 4 537 756) or recycled jointly with fresh feed materials to the phosphorus furnace. Recycling Cottrell-dust containing considerable quantities of phosphorus and phosphorus compounds into the phosphorus furnace is higly desirable for reasons of economy; needless to say however that the metallic constituents, especially heavy metal representatives, commence concentrating in the recycled Cottrell-dust and are liable to affect operation of the phosphorus furnace and electric precipitator.

It is therefore desirable to have a process permitting Cottrell-dust to be processed firstly into a phase containing little metal and secondly into a phase rich in metal or metal oxide.

This is achieved in accordance with this invention by initially calcining the dust with continuous agitation under oxidizing conditions at temperatures of 300° to 800° C.; mixing the resulting calcined matter with carbon and treating the mixture at temperatures of 950° to 1200° C. under reducing conditions with volatilization of the metallic constituents; and condensing the volatilized metallic constituents and separating them.

Further preferred and optional features of the process of this invention provide:

(a) for the dust to be made with water into a suspension, for the suspension to be filtered and for the resulting filter cake to be treated;
(b) for the suspension to be made by mixing the dust with water in a ratio by weight of 1:(2–5);
(c) for the calcined matter to be ground;
(d) for the mixture of calcined matter and carbon to be made with phosphorus into compact material;
(e) for the compact material to be briquetted;
(f) for the calcined matter and carbon to be mixed in a ratio by weight of 10:1 to 10:3.

The residue obtained in the process of this invention contains considerably less important quantities of metal constituents, especially heavy metal constituents, than the Cottrell-dust initially used.

The treatment under the reducing conditions of this invention can be effected in a fluidized bed or circulated bed or discontinuously in a fixed bed.

An inert gas, e.g. nitrogen, or a reducing gas, e.g. carbon monoxide or hydrogen, or also a mixture thereof should conveniently be used as a carrier gas in the process of this invention. In all those cases in which air is the carrier gas used for treating the calcined matter, the reducing gas is produced in situ by oxidizing the active carbon to carbon monoxide.

The carrier gas used in the process of this invention coming from the condensing stage should conveniently be recycled and used again for treating calcined matter.

Basically, the contact time is not critical in the process of this invention but extremely short contact times should be avoided.

EXAMPLE 1

(Comparative Example)

132 g filter cake obtained by filtering an aqueous suspension of Cottrell-dust, containing 21.4% total phosphorus (calculated as $P_2O_5$) as well as 0.14% gallium, 0.60% cadmium, 10.4% zinc and 0.86% lead was dried for 2 hours at 300° C. and ground. The dry ground material (100 g) was mixed with 20 g active carbon. The mixture so obtained was given into a quartz tube lined with Pythagoras mass, heated in a stream of carbon monoxide (6 l/h) to 1050° C. and maintained at that temperature for 1 hour. The issuing gas phase was passed through a cooled receiver in which condensed matter was collected. In order to completely burn the active carbon, the residue (100.8 g) retained in the reaction tube was calcined at 800° C. to constant weight while air was passed through, and 85.0 g residue remained behind. It contained 19.8% $P_2O_5$, 0.22% gallium, 0.032% cadmium, 8.0% zinc and 0.91% lead. The contents in filter cake and residue were compared and found to have been reduced at the following percentages: total phosphorus (calculated as $P_2O_5$) at 40.1%, gallium at 89.9%, cadmium at 96.6%, zinc at 50.5% and lead at 32.5% (cf. Table 1).

EXAMPLE 2 (invention)

200 g dried and ground filter cake of Example 1 was calcined for 2 hours in a laboratory rotary kiln at 600° C. in contact with air (200 l/h). The calcined matter contained 21.8% $P_2O_5$, 0.12% Ga, 0.48% Cd, 10.4% Zn and 0.71% Pb.

100 g of the calcined matter was mixed with 25 g active carbon and the mixture was made into a paste with 42 g phosphoric acid (20.5% $P_2O_5$) and the paste was briquetted. The Briquettes were introduced into the reaction tube of Example 1 and dried at 150° C., next, a CO-stream was passed through and the whole was heated to a final temperature of 950° C. which was maintained over a period of 90 minutes. The issuing gas phase was passed through a cooled receiver in which condensed matter was collected. The residual active carbon was burnt and the material was calcined to constant weight as described in Example 1.

93 g residue containing 27.5% $P_2O_5$, 0.06% Ga, 0.020% Cd, 6.3% Zn and 0.10% Pb was obtained. The percentage reductions calculated from the metal contents of filter cake and residue are indicated in Table 1.

EXAMPLE 3 (INVENTION)

Example 2 was repeated with that modification however that the final temperature in the quartz tube was 1050° C.

75.5 g residue containing 16.1% $P_2O_5$, 0.02% Ga, 0.010% Cd, 1.2% Zn and 0.10% Pb was obtained. The percentage reductions calculated from the metal contents of filter cake and residue are indicated in Table 1.

EXAMPLE 4 (INVENTION)

Example 2 was repeated with that modification however that the final temperature in the quartz tube was 1115° C.

70.6 g residue containing 10.5% $P_2O_5$, 0.01% Ga, 0.010% Cd, 0.025% Zn and 0.10% Pb was obtained. The percentage reductions calculated from the metal contents of filter cake and residue are indicated in Table 1.

EXAMPLE 5 (COMPARATIVE EXAMPLE)

Example 1 was repeated with that modification however that a stream of air (20 l/h) replacing the carbon monoxide was passed through the reaction tube.

87.1 g residue containing 20.7% $P_2O_5$, 0.083% Ga, 0.06% Cd, 12.0% Zn and 0.96% Pb was obtained. The percentage reductions calculated from the metal contents of filter cake and residue are indicated in Table 2.

EXAMPLE 6 (INVENTION)

100 g calcined matter obtained as described in Example 2 (containing 18.6% $P_2O_5$, 0.16% Ga, 0.91% Cd, 10.9% Zn and 0.96% Pb) was mixed with 20 g active carbon. The mixture was introduced into the reaction tube of Example 1 and while a stream of air (20 l/h) was passed through, the whole was brought to a final temperature of 1050° C. which was maintained over a period of 90 minutes. The issuing gas phase was treated and residual active carbon was burnt as described in Example 1.

83.3 g residue containing 18.6% $P_2O_5$, 0.03% Ga, 0.05% Cd, 5.3% Zn and 0.51% Pb was obtained. The percentage reductions calculated from the metal contents of filter cake and residue are introduced in Table 2.

TABLE 1

| | Carrier gas in reaction tube: carbon monoxide | | | |
|---|---|---|---|---|
| Reduction in % | Ex. 1 1050° C. | Ex. 2 950° C. | Ex. 3 1050° C. | Ex. 4 1115° C. |
| Phosphorus (calculated as $P_2O_5$) | 40.1 | 15.6* | 60.0* | 75.5* |
| Ga | 89.9 | 53.4 | 87.4 | 94.0 |
| Cd | 96.6 | 96.1 | 98.4 | 98.5 |
| Zn | 50.5 | 43.5 | 91.3 | 99.8 |
| Pb | 31.8 | 86.8 | 89.4 | 89.9 |

*$P_2O_5$ additionally used for briquetting included

TABLE 2

| | Carrier gas in reaction tube: air | |
|---|---|---|
| Reduction in % | Ex. 5 1050° C. | Ex. 6 1050° C. |
| Phosphorus (calculated as $P_2O_5$) | 36.0 | 16.7 |
| Ga | 60.9 | 84.4 |
| Cd | 93.5 | 95.4 |
| Zn | 24.0 | 59.5 |
| Pb | 26.4 | 55.7 |

We claim:

1. A process for removing metallic constituents selected from the group consisting of zinc, cadmium, lead, silver, gallium and germanium from dust electrostatically separated from a gas mixture comprising carbon monoxide and phosphorus in vapor form obtained during the production of yellow phosphorus from a feed material comprising crude phosphate in an electrothermal phosphorus furnace, said dust being relatively high in its content of metallic constituents as compared to said feed material, said process comprising: initially mixing said dust of relatively high metallic content compared to said feed material with water in a ratio by weight of 1:(2 to 5) with the resultant formation of a suspension; filtering the suspension; calcining the resulting filter cake, also of relatively high metallic content, with continuous agitation under oxidizing conditions at temperatures of 300° to 800° C.; grinding the resulting calcined matter, also of relatively high metallic content, and mixing it with carbon in a ratio by weight of 10:1 to 10:3; making the mixture with phosphoric acid into compact material, also of relatively high metallic content; treating the compact material at temperatures of 950° to 1200° C. under reducing conditions with volatilization of the metallic constituents; and separating the volatilized metallic constituents by condensing them.

2. The process as claimed in claim 1, wherein the compact material is treated at temperatures of 1000° to 1100° C. under reducing conditions.

3. A process for removing metallic constituents selected from the group consisting of zinc, cadmium, lead, silver, gallium and germanium from dust electrostatically separated from a gas mixture comprising carbon monoxide and phosphorus in vapor form obtained during the production of yellow phosphorus from a feed material comprising crude phosphate in an electrothermal phosphorus furnace, said dust being relatively high in its content of metallic constituents as compared to said feed material, said process comprising: initially mixing said dust of relatively high metallic content compared to said feed material with water in a ratio by weight of 1:(2 to 5) with the resultant formation of a suspension, filtering the suspension; calcining the filter cake, also of relatively high metallic content, with continuous agitation under oxidizing conditions at temperatures of 300° to 800° C.; grinding the resulting calcined matter, also of relatively high metallic content, and mixing it with carbon in a ratio by weight of 10:1 to 10:3; making the mixture with phosphoric acid into compact material, also of relatively high metallic content; briquetting the compact material; treating the resultant briquettes at temperatures of 950° to 1200° C. under reducing conditions with volatilization of the metallic constituents; and separating the volatilized metallic constituents by condensing them.

4. The process as claimed in claim 3, wherein the briquettes are treated at temperatures of 1000° to 1100° C. under reducing conditions.

* * * * *